United States Patent
Dagate et al.

(10) Patent No.: US 6,577,605 B1
(45) Date of Patent: Jun. 10, 2003

(54) SYSTEM, METHOD AND APPARATUS FOR AUTOMATICALLY DISTRIBUTING MULTIMEDIA CALLS

(75) Inventors: Michael P. Dagate, Plano, TX (US); Kevin G. Conley, Carrollton, TX (US); Kevin S. Hartman, Flower Mound, TX (US); Scott Vollmer, Allen, TX (US)

(73) Assignee: Viewcast.com, Inc., Dallas, TX (US)

(*) Notice: Subject to any disclaimer, the term of this patent is extended or adjusted under 35 U.S.C. 154(b) by 0 days.

(21) Appl. No.: 09/335,549

(22) Filed: Jun. 18, 1999

(51) Int. Cl.[7] .................. H04Q 11/00; H04L 12/66; H04M 3/00
(52) U.S. Cl. .................. 370/270; 370/352; 379/265.09
(58) Field of Search .................. 370/353, 356, 370/259, 265, 352, 270; 379/265.09

(56) References Cited

U.S. PATENT DOCUMENTS

| | | | |
|---|---|---|---|
| 4,564,940 A | 1/1986 | Yahata | 370/124 |
| 4,645,872 A | 2/1987 | Pressman et al. | 379/54 |
| 4,686,698 A | 8/1987 | Tompkins et al. | 379/53 |
| 4,710,917 A | 12/1987 | Tompkins et al. | 370/62 |
| 4,716,585 A | 12/1987 | Tompkins et al. | 379/202 |
| 4,847,829 A | 7/1989 | Tompkins et al. | 370/62 |
| 4,885,747 A | 12/1989 | Foglia | 370/123 |
| 5,008,879 A | 4/1991 | Fischer et al. | 370/85.2 |
| 5,010,399 A | 4/1991 | Goodman et al. | 358/85 |
| 5,014,267 A | 5/1991 | Tompkins et al. | 370/62 |
| 5,164,982 A | 11/1992 | Davis | 379/96 |
| 5,389,963 A | 2/1995 | Lepley et al. | 348/7 |
| 5,400,068 A | 3/1995 | Ishida et al. | 348/14 |
| 5,444,477 A | 8/1995 | Yamadera et al. | 348/15 |
| 5,473,680 A | 12/1995 | Porter | 379/201 |
| 5,530,744 A * | 6/1996 | Charalambous et al. | 379/112.05 |
| 5,537,142 A | 7/1996 | Fenouil | 348/12 |
| 5,563,937 A | 10/1996 | Bruno et al. | 379/201 |
| 5,565,910 A | 10/1996 | Rowse et al. | 348/15 |
| 5,594,732 A | 1/1997 | Bell et al. | 370/401 |
| 5,617,539 A | 4/1997 | Ludwig et al. | 395/200.02 |
| 5,621,455 A | 4/1997 | Rogers et al. | 348/6 |
| 5,659,542 A | 8/1997 | Bell et al. | 370/496 |
| 5,689,553 A * | 11/1997 | Ahuja et al. | 348/14.09 |
| 5,689,641 A | 11/1997 | Ludwig et al. | 395/200.02 |
| 5,737,025 A | 4/1998 | Dougherty et al. | 348/473 |
| 5,737,026 A | 4/1998 | Lu et al. | 348/473 |
| 5,758,079 A | 5/1998 | Ludwig et al. | 395/200.34 |
| 5,786,844 A | 7/1998 | Rogers et al. | 348/6 |
| 5,802,294 A | 9/1998 | Ludwig et al. | 395/200.34 |
| 5,822,306 A | 10/1998 | Catchpole | 370/261 |
| 5,828,403 A | 10/1998 | DeRodeff et al. | 348/7 |
| 5,831,665 A | 11/1998 | Dezonno | 348/14 |
| 5,894,512 A * | 4/1999 | Zenner | 348/14.01 |
| 6,208,658 B1 * | 3/2001 | Pickett | 370/401 |
| 6,263,065 B1 * | 7/2001 | Durinovic-Johri et al. | 379/265.02 |
| 6,373,836 B1 * | 4/2002 | Deryugin et al. | 370/352 |
| 6,404,747 B1 * | 6/2002 | Berry et al. | 370/270 |

FOREIGN PATENT DOCUMENTS

| | | | |
|---|---|---|---|
| DE | 3319106 | 12/1984 | H04Q/11/04 |
| EP | 488289 | 6/1992 | H04N/7/14 |
| JP | 3036838 | 2/1991 | H04L/12/40 |
| JP | 3085837 | 4/1991 | H04L/12/42 |
| JP | 4167788 | 6/1992 | H04N/7/15 |

* cited by examiner

*Primary Examiner*—Chau Nguyen
*Assistant Examiner*—Nhat Do
(74) *Attorney, Agent, or Firm*—Gardere Wynne Sewell LLP (57) ABSTRACT

The present invention provides a system, method and apparatus for automatically distributing a multimedia call received from an originating end point. The present invention determines whether the multimedia call has been connected to a multimedia source for a minimum time period, selects a destination end point, and determines whether the selected destination end point is available. If the multimedia call has been connected to the multimedia source for the minimum time period or longer, and the selected destination end point is available, the present invention instructs a multimedia switch to transfer the multimedia call from the multimedia source to the selected destination end point.

4 Claims, 11 Drawing Sheets

| Name | Video ID | Codec | Admin | Status | Switch |
|---|---|---|---|---|---|
| Adline, Greg | 240 | N | N | In Service | DEMOSWITCH1 |
| Ashley, Ed | 3906 | N | N | In Service | NEC |
| AT&T, Loopback6B | 2304 | Y | N | Codec | DEMOSWITCH1 |
| Attendant, Auto | 2223 | N | N | In Service | NEC |
| Austin, Codec2B | 1023 | Y | N | Codec | DEMOSWITCH1 |
| Boomstein, David | 103 | N | N | In Service | NEC |
| Broadcast, Local TV | 5099 | N | N | In Service | DEMOSWITCH1 |
| Burger, Tom | 4817 | N | N | In Service | NEC |
| Byrne, Tom | 4833 | N | N | In Service | NEC |
| Callaghan, Kevin | 4572 | N | N | In Service | NEC |
| Capture MPEG | 5559 | N | N | In Service | NEC |
| Carter, Phillip | 4384 | N | Y | In Service | NEC |
| Channel4, MPEG | 2225 | N | N | In Service | NEC |
| Christopher, Kristen | 5498 | Y | N | In Service | NEC |
| Coffee Cam | 2000 | N | N | In Service | DEMOSWITCH1 |
| Colquhoun, Phil | 101 | N | N | In Service | DEMOSWITCH1 |
| Conference Room | 994 | N | N | In Service | DEMOSWITCH1 |
| Conley, Kevin | 7184 | Y | N | In Service | DEMOSWITCH1 |
| Courthouse, Ascension | 663 | N | N | In Service | DEMOSWITCH1 |
| Cowen, Bruce | 185 | N | N | In Service | DEMOSWITCH1 |
| Cozzoino, Cliff | 4857 | N | N | In Service | DEMOSWITCH1 |

Attribute Codes
N - Normal Call  B - Broadcast  C - Conference

Fig.7

Modify User

User Type: Device ▸
Name
Satellite ▸
Conference Board: None ▸
Password

Video ID: 997 ▸
Switch: DEMOSWITCH1 ▸
Status: In Service ▸

☑ ACD Broadcast — 208
☐ Camera Control Host ID

Advanced
☐ Hide User
☐ Administrator
☐ Reset Security

OK — 210
Cancel
Help
Contact...
Workstation
H/W Info...

| Codec Manager | Name | Hardware Type | In Use | Status |
|---|---|---|---|---|
| Demoswitch1 | NEC | Local Codec | No | In Service |
| Demoswitch1 | Osprey 1000 | Local Codec | No | In Service |

Add...
Delete...
Usage...
Setup...

SYSTEM, METHOD AND APPARATUS FOR AUTOMATICALLY DISTRIBUTING MULTIMEDIA CALLS

FIELD OF THE INVENTION

The present invention relates generally to multimedia networks and more particularly to a system, method and apparatus for automatically distributing multimedia calls.

BACKGROUND OF THE INVENTION

Without limiting the scope of the present invention, this background of the present invention is described in connection with automatic call distributor ("ACD") systems used in multimedia communication networks.

ACD systems are well known in audio communication networks. Typically, these ACD systems are used in call centers to connect a customer, who has placed an audio telephone call to the call center over a public switched telephone network ("PSTN"), to an operator or agent within a private branch exchange ("PBX") in the call center. The ACD controls the PBX to automatically and efficiently distribute the incoming calls to the available operators.

More recently, attempts have been made to incorporate ACD systems in multimedia or audio/visual networks. These multimedia ACD systems often require separate switches for audio and video, high performance local area network ("LAN") architectures, or use compressed video transmissions. Moreover, these multimedia ACD system are typically limited to incoming multimedia calls using a single communication protocol, cannot use existing unshielded twisted pair ("UTP") wiring, or cannot transfer an incoming multimedia call more than once. As a result, inexpensive and less complex multimedia ACD systems are very limited and versatile multimedia ACD systems are expensive and very complex.

SUMMARY OF THE INVENTION

The present invention provides a computer program and method for automatically distributing a multimedia call received from an originating end point. The present invention routes the multimedia call to a multimedia source using a multimedia switch. Thereafter, the present invention determines whether to transfer the multimedia call from the multimedia source to a destination end point using an automatic call distributor. When the automatic call distributor determines that the multimedia call is to be transferred, present invention transfers the multimedia call from the multimedia source to the destination end point using the multimedia switch.

In addition, the present invention provides a computer program and method that determines whether the multimedia call has been connected to a multimedia source for a minimum time period. The present invention selects a destination end point and determines whether the selected destination end point is available. When the multimedia call has been connected to the multimedia source for the minimum time period or longer, and the selected destination end point is available, the present invention instructs a multimedia switch to transfer the multimedia call from the multimedia source to the selected destination end point.

The present invention also provides a system for automatically distributing a multimedia call received from a originating end point via a network. The system comprises one or more codecs, one or more multimedia sources, one or more destination end points, and an automatic call distributor, all of which are connected to a multimedia switch. The one or more codecs are also connected to the network. The automatic call distributor determines whether to transfer the multimedia call from one of the multimedia sources to one of the destination end points.

Other features and advantages of the present invention shall be apparent to those of ordinary skill in the art upon reference to the following detailed description taken in conjunction with the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

The present invention provides a high-performance, high-quality multimedia networking system that uses existing UTP building wiring and an easy to use, flexible video PBX system ("VBX System") to enable multimedia communication between hundreds of users throughout a building, a campus or the world. The VBX System is preferably operates within a Windows® environment, but can be adapted to run on any operating platform that is familiar to users and allows existing computers to be easily modified to support multimedia communications.

Unlike other multimedia local area network ("LAN") systems, the VBX System does not rely on highly compressed video, quarter-screen resolution, or high-performance LAN architectures. Instead, the VBX System uses a unique media-switched architecture, which delivers high-quality video and audio content over a hub-and-spoke twisted-pair wiring topology, and utilizes the corporate LAN only for client-server control and communications. The VBX System can network hundreds of simultaneous streams of NTSC-quality, full-screen video without compression. Furthermore, the VBX System offers an economical yet high-performance solution compared with other approaches requiring expensive LAN and desktop upgrades.

The VBX System provides the following features and functions:

1. Video Display
   a. Active Call Indicator
   b. Sizable to 640×480
   c. Access to all features
   d. Put calls on hold
2. Dialer
   a. Directory dialing
   b. Speed dial
   c. Last number redial
3. Call Control
   a. Dial
   b. Answer
   c. Hold
   d. Transfer
   e. Conference
   f. Volume control
   g. Call logs
4. Surveillance—Cycle through list
5. Multi-point communications
   a. Up to seven participants
   b. Four active video windows
   c. Multi-point broadcast
6. Broadcast
   a. Share Digital Broadcast Satellite (DBS) or cable TV access
   b. Network VCRs, videodisc players
   c. Multi-cast speeches across the network
   d. User-selected broadcast source
7. Administration
   a. Windows NT operating system
   b. Moves, adds, changes made easy
   c. Maintain user database
   d. Maintain hardware database
   e. Password protected for security
   f. Make and tear-down calls
   g. Configure networked switches
8. Wide Area Network
   a. UTP or coaxial non-compressed trunks
   b. H.320 standard compression
   c. Connect to installed room systems
9. Cabling
   a. UTP
      i. Loop lengths up to 3,500 ft (Cat. 5)
      ii. Loop lengths up to 1,500 ft (Cat. 3)
      iii. 16 ports on transmit line card
      iv. 16 ports on receive line card
      v. 128 users per switch
      vi. 48 simultaneous calls
   b. Coax
      i. Loop lengths up to 200 ft
      ii. Eight ports on transmit line card
      iii. Eight ports receive line card
10. Transceiver
    a. Compact
    b. Video in/out
    c. Audio in/out
    d. Phone jack
    e. Configurable loop length The VBX System is managed by a VBX System Administrator, which is typically a Windows 95/NT-based application. The VBX Administrator can establish users, identify and establish new local or remote hardware, initiate calls and multimedia sources, control receive only feeds, and monitor the status of current calls.

Referring FIG. 1, a block diagram of a multimedia communications network in accordance with the present invention is shown and will now be described. The central piece of the VBX System 20 is the multimedia switch or VBX Server 22, 24 and 26, which works as a central switch to handle point-to-point and multi-point multimedia communications. The VBX Server 22, 24 and 26 can be configured to meet the needs of any multimedia network. For example, VBX Server 26 is configured to interface with a single coder/decoder ("codec") 28; whereas, VBX Server 22 is configured to operate an ACD Filter 30 or optional third-party ACD 32, and VBX Server 24 is configured to perform simpler switching functions.

The VBX Server 22 and 24 allow users to share multimedia sources 32 from broadcast receivers, such as CATV feeds, Digital Broadcast Satellite ("DBS") receivers and television tuners. The multimedia source 32 may also be multimedia playback devices, such as video servers, VCRs, videodisc players, compressed video wide area network ("WAN") connections, or NTSC video cameras. The associated audio is optional. The audio and video outputs are typically RCA-style phono jacks. These multimedia sources 32 are typically connected to the VBX Server 22 and 24 using a coax input port. In fact, users can share these multimedia sources 22 together with multi-point video conferencing, while enjoying full-screen, National Television Systems Committee ("NTSC") or Phase Alternating Lines ("PAL") quality video at their end point 34, which may be a multimedia workstation or multimedia communication device, such as a video phone or television with phone capability. As will be described below, these multimedia sources 32 may be configured as a normal broadcast or an ACD broadcast.

Similarly, any standard NTSC or PAL composite video device can be connected as a display device or monitor 36 to the VBX Server 24 using a coax output port. The monitor 36 may be a television monitor, which requires a composite video input connector, or a VCR or other multimedia recording device. The associated audio is optional. The audio and video outputs are typically RCA-style phono jacks.

As previously mentioned, end points 34 may be multimedia workstations or multimedia communication devices. When the VBX Server 22 and 24 is being controlled by the ACD Filter 30 or Third-party ACD 32, the end points 34 are referred to as destination end points or operators and are preferably multimedia workstations. Such multimedia workstations run a client application that provides full-featured interactive desktop audio/video communications, controlled from a dynamic interface that is as easy to use as a regular telephone. Preferably, each multimedia workstation should meet the following minimum requirements:

486/33 PC or faster;

Video monitor capable of VGA (640×480) resolution or greater;

Video capture card (frame grabber) with the ability to display

NTSC composite video;

Video camera;

Microphone;

Speakers; and

Network connectivity to the VBX System 20 Server and support for TCP/IP.

Other specifications may be required for non-Windows® based systems.

Various devices are connected to VBX Servers 22, 24 and 26 with spare Unshielded Twisted Pair ("UTP") wiring 38 or coaxial ("coax") cable 40 for distribution of video and audio. Each twisted wire pair 38 can carry both video and audio in one direction up to 3,500 feet. Most installed UTP wiring 38 includes four twisted pairs (a total of eight wires). Of these, only two pairs are used by 10BaseT Ethernet networks, leaving two unused pairs. Using these two spare pairs, the VBX Servers 22, 24 and 26 can implement bi-directional video and audio communication. In addition to these spare wires, many installations run multiple four-pair UTP wiring 38 to each destination. Even if no UTP wiring 38 is available in at a facility, UTP wiring 38 is easier and much less expensive to install than coax cable 40. Like 10BaseT Ethernet networks, VBX System 20 UTP connections use a hub-and-spoke topology where each user or end point 34 is wired directly to the VBX Servers 22 and 24. Because video and audio are passed over dedicated UTP wiring 38, there is no effect on data traffic in the LAN 42.

VBX Server 22 is connected to a Codec Array 44, which in this case includes three codecs 46, 48 and 50, and two individual codecs 52 and 54, each connected to the VBX Server 22 with coax cable 40. Codecs 50 and 52 conform to the H.320 protocol, codecs 46 and 48 conform to the H.323 protocol, and codec 54 conforms to the H.324 protocol. Other types of codecs, such as TCP/IP and MPEG, are available and can be used with the VBX System 20. All codecs are controlled by the Codec Manager 56 (illustrated by dashed line 58). The Codec Manager 56, a separate software process, is used to manage shared codecs. The Codec Manager 56 may be run on either the Codec Array 44 or the VBX Server 22.

Multimedia communications or calls between the H.323 end point 60 and the VBX Server 22 are established via the Internet 62 and codecs 46 and 48. H.323 end points 60 are typically H.323 compatible computers. Similarly, multimedia communications or calls are established between H.320 end points 64 and 66 and the VBX Server 22 via ISDN network 68 and codecs 50 and 52. H.320 end points 64 and 66 are typically multimedia desktop systems or room systems. Likewise, multimedia communications or calls between the H.324 end points 70 and 72 and the VBX Server 22 are established via POTS network 74 and codec 54. H.324 end points 70 and 72 may be video phones, televisions with phone capability or H.324 compatible computers.

The shared codecs 28, 50 and 52 enable the VBX Server 22 to communicate with another VBX Server 26 at a remote site, or with other H.320 end points 64 and 66, such as a multimedia desktop or room systems. Codecs are normally made up of an Osprey 1000 card for performing the H.320 video and audio compression/decompression and an ISDN card for connecting to the remote system. The two cards (Osprey and ISDN) are connected together inside the chassis using an MVIP cable (ribbon cable). Additional codecs can be installed in an additional chassis. Video and audio from the VBX Server 22 is supplied to the codec through a coax input/output port (it is also possible to connect a codec using a transceiver). The video and audio are compressed by the codec, supplied to the ISDN card, and sent to the remote system.

Compressed data rates of 128 kbits/sec to 384 kbits/sec are supported by the Osprey 1000. Compressed video and audio from the remote system are routed from the ISDN card to the codec, where they are decompressed and converted to NTSC video and line level audio. These signals are supplied to the VBX Server 22 via a coax input port (or transceiver). Users communicate with remote systems in the same way they communicate with local users; however, the calls may take a little longer to connect.

In large implementations, multiple VBX Servers 22 and 24 may be needed to provide a connection to each end point 34, multimedia source 32 or multimedia monitor 36. In these cases, the VBX Servers 22 and 24 are connected together with direct trunk lines 76. The direct trunk lines 76 provide a way for a user connected to VBX Server 22 to talk to another user connected to VBX Server 24.

Figure 2:
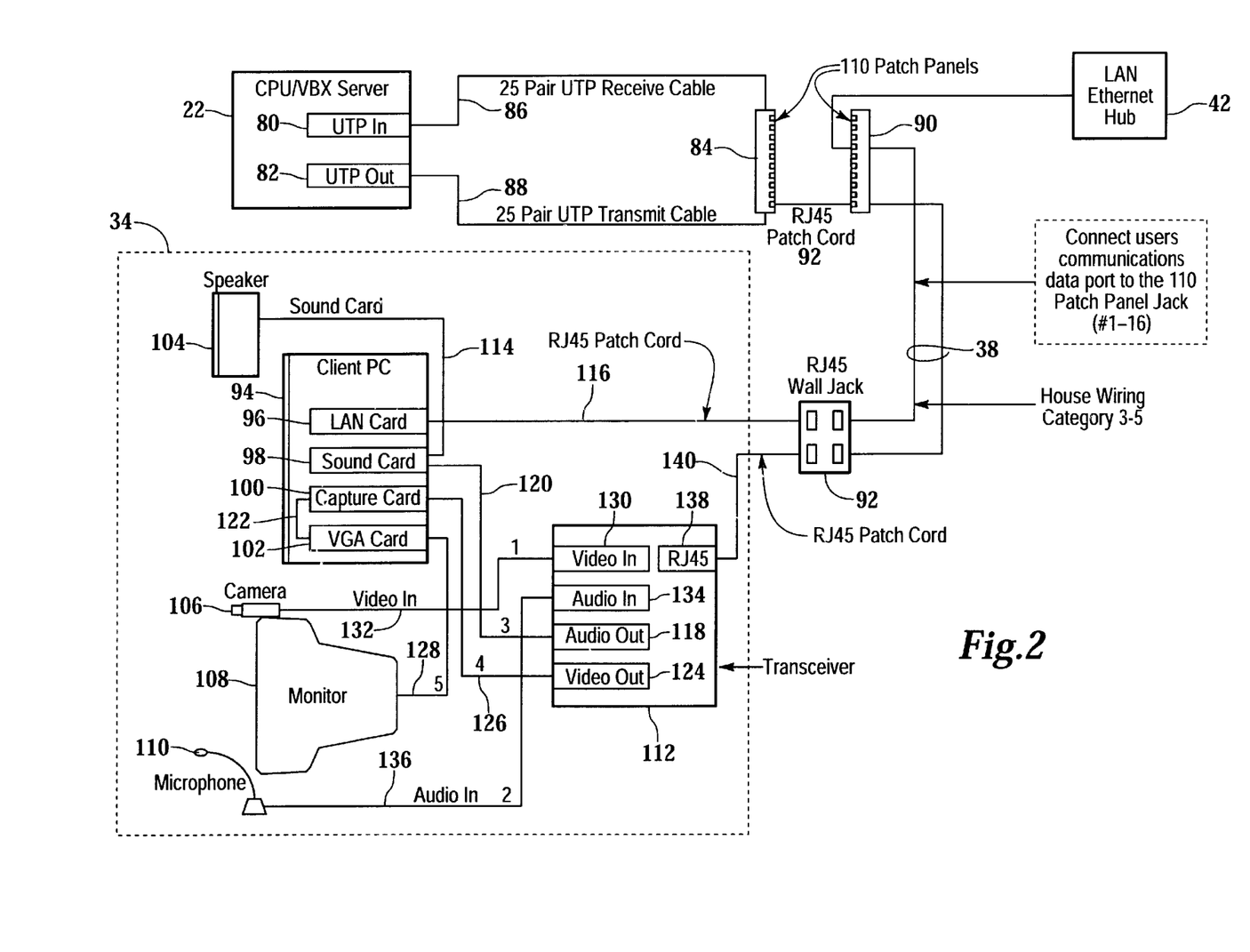
FIG. 2 is a block diagram of the connection between a VBX Server, and end point and a LAN in accordance with the present invention.

FIG. 2 illustrates the connection between a VBX Server 22 and an endpoint 34 (multimedia workstation) and the LAN 42. Devices in the VBX System 20 are controlled by communications sent through the existing LAN 42 infrastructure. The client software, running on an individual workstation 34, communicates with the server software, running on the VBX Server 22 using the TCP/IP protocol. Messages passed from client to server may include Dial User, Get Directory Listing, and Hang Up. Messages typically use only a few bytes (a directory listing may use a few hundred bytes), so there is virtually no impact on other traffic in the LAN 42.

In this illustration, the VBX Server 22 has a UTP In server card 80 and a UTP Out server card 82. The UTP In server card 80 is connected to a patch panel 84 via a 25-pair UTP receive cable 86 with 50-pin Telco-style connectors on each end. Similarly, the UTP Out server card 82 is connected to the patch panel 84 via a 25-pair UTP transmit cable 88 with 50-pin Telco-style connectors on each end. Patch panel 84 is connected to a second patch panel 90 with RJ45 patch cords 92. The LAN 42 is connected to the second patch panel 84.

The patch panels 84 and 90 enable UTP video connections to be interconnected over standard wiring installations. Most installations use patch panels of RJ-45 jacks to connect Ethernet 10baseT ports. This same wiring systems can be used to connect VBX users. Each patch panel 84 and 90 holds 16 UTP input/output ports.

Each multimedia workstation (end point 34) is connected to a RJ45 wall jack 92, which is connected to the second patch panel 90 through existing category 3 or 5 UTP building wiring 38. Specifically, the multimedia workstation (end point 34) is a personal computer 94 having a LAN card 96, sound card 98, video capture card 100, VGA card 102, speaker 104, camera 106, monitor 108, microphone 110, and a transceiver 112. The multimedia workstation (end point 34) configured as follows:

Connect the speaker 104 to the sound card 98 line-out connection with cable 114;

Connect the LAN card 96 to the RJ45 wall jack 92 with RJ45 patch cord 116;

Connect the sound card 98 line-in connection to the transceiver audio out connection 118 with cable 120;

Connect the video capture card 100 to the VGA card 102 with internal connection 122;

Connect the video capture card 100 to the transceiver video out connection 124 with cable 126;

Connect the VGA card 102 output to the monitor 108 with monitor cable 128;

Connect the camera 106 output to the transceiver video in connection 130 with cable 132;

Connect the microphone 110 output to the transceiver audio in connection 134 with cable 136; and Connect the transceiver RJ45 connection 138 to the RJ45 wall jack 92 with RJ45 patch cord 140.

Figure 3:
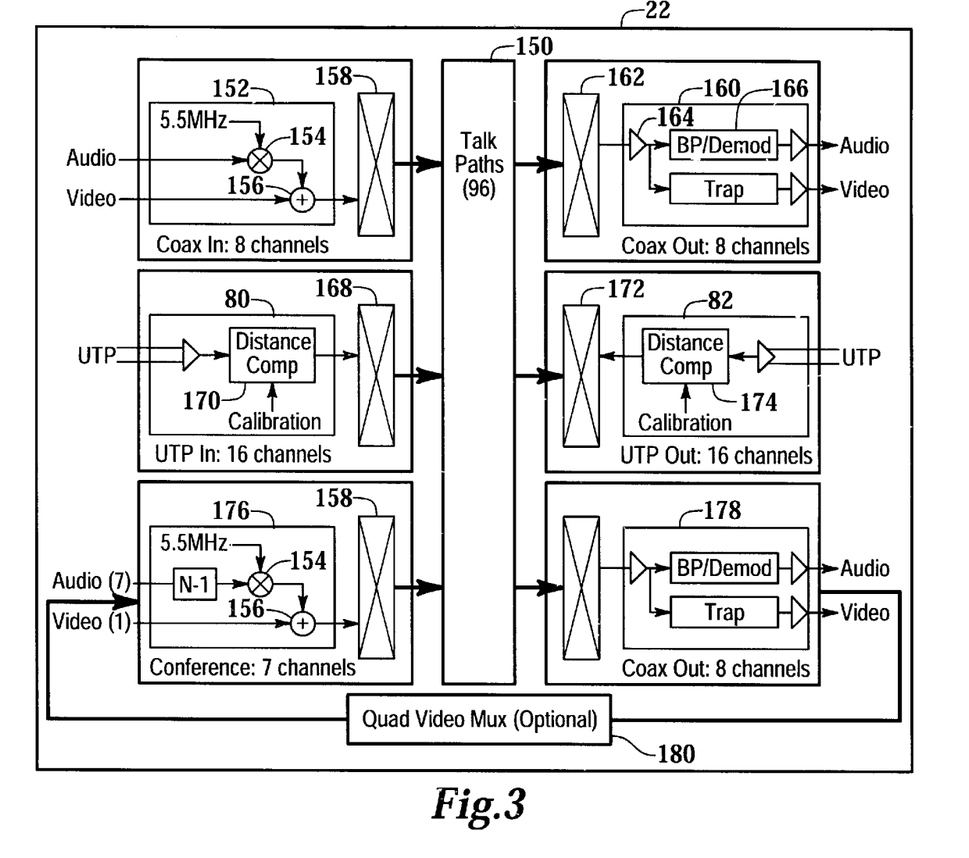
FIG. 3 is a signal flow diagram of a VBX Server in accordance with the present invention.

Now referring to FIG. 3, the signal flow diagram in accordance with the present invention will be described. The VBX Server 22 is based on an industrial rack-mounted PC chassis running the Windows NT 4.0 operating system. Other operating systems may be used. Several configurations of the chassis are available depending on the specific requirements for each installation, such as whether wide area connectivity is needed. The PC is based on a passive backplane with ISA and PCI card slots, and a Pentium CPU on a card. Typically, 16 slots are available for VBX cards and 2 slots for codecs. Multiple rack-mount chassis can be installed and interconnected for support of larger installations. For systems requiring a large number of codecs, the codecs may reside in a separate chassis mounted in the same rack (Codec Array 44, FIG. 1).

VBX cards are full-length ISA cards that plug into standard ISA slots in the passive backplane. External VBX connections from each card are located at the backplate of each card. DIP switches on each card set the card address to allow the software to control the card. The VBX Server software running on the rack-mount PC performs the following functions:

Communicates with clients and other servers;

Maintains a database of installed hardware and connected users;

Controls the flow of video and audio through the switch; and

Logs the system usage for management and billing purposes.

The Codec Manager 56 (FIG. 1) software manages the codecs runs as a separate process and communicates with the VBX Server software. The VBX Server 22 can be used for other purposes simultaneously, such as a file server or for non-multimedia communications, but multimedia call performance is optimized when the VBX Server 22 remains dedicated to VBX System 20 tasks.

The VBX cards within the VBX Server 22 are interconnected by dedicated switching or talk paths 150 that carry the combined video and audio signals. The talk paths 150 are implemented on circuit boards that plug into the top of each VBX card. A total of 96 talk paths are available for one-way video and audio, supporting a total of 48 two-way conversations or 96 one-way multimedia sources 32 (FIG. 1). Multiple users viewing a broadcast share one talk path 150. Conferences require two talk paths 150 for each conference participant. Each VBX card can connect each of its channels to any of the 96 talk paths 150 under VBX Server software control. Input cards place a selected signal onto a selected talk path 150 for distribution to output cards. Output cards connect a talk path 150 to a selected output port.

Coax input cards 152 accept eight channels of baseband video and line-level audio inputs. All input connections are RCA (phono) jacks compatible with standard television or VCR cables. For each channel, the audio signal is modulated onto a carrier by circuit 154, then combined with the video signal for distribution by circuit 156. Under VBX Server software control, each input can be switched by circuit 158 to any talk path 150 for distribution. Coax input cards 152 are typically used as the source for broadcast or closed-circuit video. Coax input cards 152 are also used to connect codecs to the VBX Server 22 and can be used to connect users or end points 34 (FIG. 1) located near the VBX Server 22.

Coax output cards 160 output eight channels of baseband video and line-level audio outputs. For each channel, a video and audio source is selected by circuit 162 under VBX Server software control from a talk path 150, then the audio signal is separated from the video signal by circuit 164 and demodulated by circuit 166. All video and audio output connections are RCA (phono) jacks compatible with standard television or VCR cables. Coax output cards 160 are typically used for video and audio output to a VCR or monitor 36 (FIG. 1) located near the VBX Server 22. Coax output cards 160 are also used to connect codecs to the VBX Server 22 and can be used to connect users or end points 34 (FIG. 1) located near the VBX Server 22.

Figure 4:
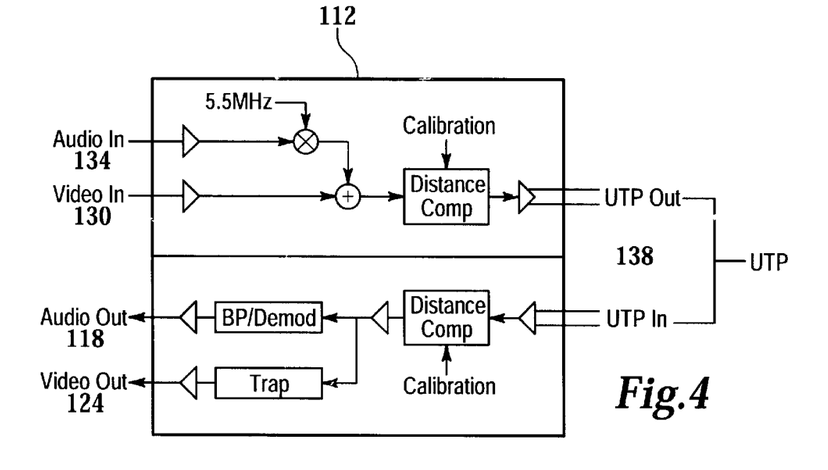
FIG. 4 is a block diagram of a transceiver in accordance with the present invention.

UTP input cards 80 accept 16 channels of combined video and audio from a differential twisted pair media. Input connections are 50-pin Telco-style connectors used to connect to facility wiring 38 (FIG. 2). The connectors attach to standard RJ-45 patch panels 84 (FIG. 2) or other UTP wiring systems. Under VBX Server software control, each input can be switched by circuit 168 to any talk path 150 for distribution. UTP input cards 80 are typically used in conjunction with UTP output cards 82 to connect users or end points 34 (FIG. 1) to the VBX Server 22. For each channel, the VBX Server software controls line compensation hardware 170 that calibrates the signal for the length of the UTP cable. A corresponding setting must be selected using DIP switches on the transceiver 112 (FIGS. 2 and 4). UTP input cards 80 are also used to implement the direct trunk lines 76 (FIG. 1) between VBX Servers 22 and 24 (FIG. 1). Although coax connections can be used, UTP connections are preferred for two reasons: (1) 16 trunks can be implemented per card pair versus 8 trunks per coax cards; and (2) signal quality is maintained because the audio is not demodulated and re-modulated as with coax trunk interfaces.

UTP output cards 82 supply 16 channels of combined video and audio to a differential twisted pair media. Output connections are 50-pin Telco-style connectors used to connect to facility wiring 38 (FIG. 2). The connectors attach to standard RJ-45 patch panels 84 (FIG. 2) or other UTP wiring systems. Under VBX Server software control, each output can be switched by circuit 172 to any talk path 150 for distribution. UTP output cards 82 are typically used in conjunction with UTP input cards 80 to connect users or end points 34 (FIG. 1) to the VBX Server 22. For each channel, the VBX Server software controls line compensation hardware 174 that calibrates the signal for the length of the UTP cable. A corresponding setting must be selected using DIP switches on the transceiver 112 (FIGS. 2 and 4). UTP output cards 82 are also used to implement the direct trunk lines 76 (FIG. 1) between VBX Servers 22 and 24 (FIG. 1). Although coax connections can be used, UTP connections are preferred for two reasons: (1) 16 trunks can be implemented per card pair versus 8 trunks per coax cards; and (2) signal quality is maintained because the audio is not demodulated and re-modulated as with coax trunk interfaces.

The combination of a conference input card 176 and a standard coax output card 178 allows up to seven users to participate in one video conference. These cards 176 and 178 support three unique types of conferences as shown in the following table:

| Conference Type | Audio | Video |
|---|---|---|
| Informal | Mix minus* | Video follows voice (internal**) |
| Formal | Mix minus* | Chairman control (internal**) |
| Continuous Presence | Mix minus* | Quad unit mix (external**) |

*Mix minus means that each participant in a conference call hears all other participants, but not his own audio.
**Intenal and external refers to the equipment type needed to complete the conference. Internal conferences only use the cards 176 and 178 in the VBX Server 22. External conferences use cards 176 and 178 along with the external Quad Multiplexer Unit ("Quad Unit") 180. The Quad Unit 180 combines the video from four participants and displays each in one quadrant of the monitor.

The three conference types are supported by using the coax output card 178 to supply the video and audio from each of up to seven participants to the conference input card 176. The eighth coax output port is used to supply the selected video stream for both formal and informal conferences. The conference input card 176 performs the specialized video and audio mixing required for conferences. Interconnection of the coax output card 178 and the conference input card 176 is accomplished with a simple loopback cable connected between the two cards 176 and 178 for both video and audio. In all conference types, each participant hears all the other participants. The participant's own audio is removed from the mix (referred to as "mix minus") to minimize audio feedback.

In an informal conference, the conference input card 176 continuously monitors the audio from all participants and reports to the VBX Server software which participant is speaking. The VBX Server software then selects the video for the current speaker for output on the eighth coax output port. The conference input card 176 then distributes the video to all participants.

In a formal conference, the conference chairman controls which participant's video is seen by all the conference participants. This video is output on the eighth coax out port, and selected for distribution by the conference input card 176.

Continuous presence conferences require the addition of the Quad Unit 112, which is optional hardware, and special video cabling to interconnect it. The Quad Unit 112 accepts four video input signals from the coax output card 178 and combines them into a single video signal with each of the input signals in a quadrant. The Quad Unit 112 then routes the combined video signal to all participants through the connection to the eighth input on the conference input card 176. The first four participants are placed into a continuous presence or "window pane" two-by-two array. Additional conference participants beyond the first four can participate in the conference as view only. Their audio is heard by all, but they cannot be seen.

All VBX 20 cards incorporate test circuitry that is used by the VBX Server software for diagnostic purposes. Each time the VBX Server 22 is started, a diagnostic utility checks the integrity of the cards and talk paths 150, reporting any errors detected. There is also a red/green LED on the backplate indicating the status of the card. During server initialization, the LED turns red to indicate that the test is in progress, then turns green upon successful completion of the test.

Referring now to FIG. 4, a transceiver 112 in accordance with the present invention will be described. Transceivers 112 allow individual end points 34 or audio/video devices 32 or 36 to be connected to the VBX Server 22. Transceivers 112 convert between UTP cabling and standard composite video and line-level audio. UTP connections may be made either to a UTP input card 80 and/or UTP output card 82, or another transceiver 112. Transceivers 112 are typically powered by 6 volt DC power, normally supplied by a transformer plugged into an AC power source. The UTP cable connection is made using a standard RJ-45 jack 138. Video connections are made using RCA jacks, while audio connections are made using 3.5 mm audio jacks. An RJ-11 jack is also supplied for connection of a standard telephone set or speaker phone. Transceivers 112 also incorporate DIP switches for controlling: (1) Setting the audio input to either line level or microphone level; and (2) setting the distance from the VBX Server 22 (FIG. 2) or other transceiver 112 to allow the transceiver 112 to perform appropriate distance compensation. Speakers from a workstation can be plugged directly into the transceiver 112.

Now referring back to FIG. 1, the ACD Filter 30 of the present invention provides a mechanism for intelligently and automatically distributing a multimedia call received from an originating end point 26, 60, 64, 66, 70 or 72. The VBX Server 22 can designate a multimedia source 32 as a normal broadcast or an ACD broadcast. An ACD broadcast, which will also be referenced by 32, is similar to the normal broadcast in that multiple callers can be connected to it. Callers connected to an ACD broadcast 32, however, are subject to being processed through the ACD Filter 30, while callers connected to a normal broadcast are left alone. Typically, an ACD broadcast runs commercials, infomercials or other sales and marketing information.

The ACD Filter 30 is a basic utility program that determines how and when the multimedia callers connected to an ACD broadcast 32 are transferred to destination end points 34 or operators. Thus the ACD Filter 30 can leave the multimedia caller connected to the ACD broadcast 32 or instruct the VBX Server 22 to transfer the multimedia caller to a destination end point 34. Moreover, multimedia callers can be transferred to ACD broadcast 34 more than once, either by selected user choices (different phone numbers, voice recognition, additional data signal) or transfer by the end point 34 operator.

When the ACD Filter 30 is operating within a Windows® environment, the ACD Filter 30 is preferably written using the Microsoft Component Object Model ("COM"). Developers can modify the ACD Filter 30 to add additional features and perform the following functions:

Dial and hangup a user;
Transfer a call to another user;
Enable/disable vanity mode;
Place a call on and off hold;
Answer incoming calls;
Broadcast a station's video;
Create a conference;
Control a conference;
Query status of a conference;
Get and set the state of a user's answer mode;
Get and set the state of a user's forward mode;
Get a list of broadcast devices;

Get a list of switches;
Query the status of a user;
Query if a user is available; and
Get a text description for an error code.

The ACD Filter 30 can also be used to interface with a Third-party ACD 32. The ACD Filter 30 and the Third-party ACD 32 can communicate via link 78 or through the LAN 42.

Figure 5:
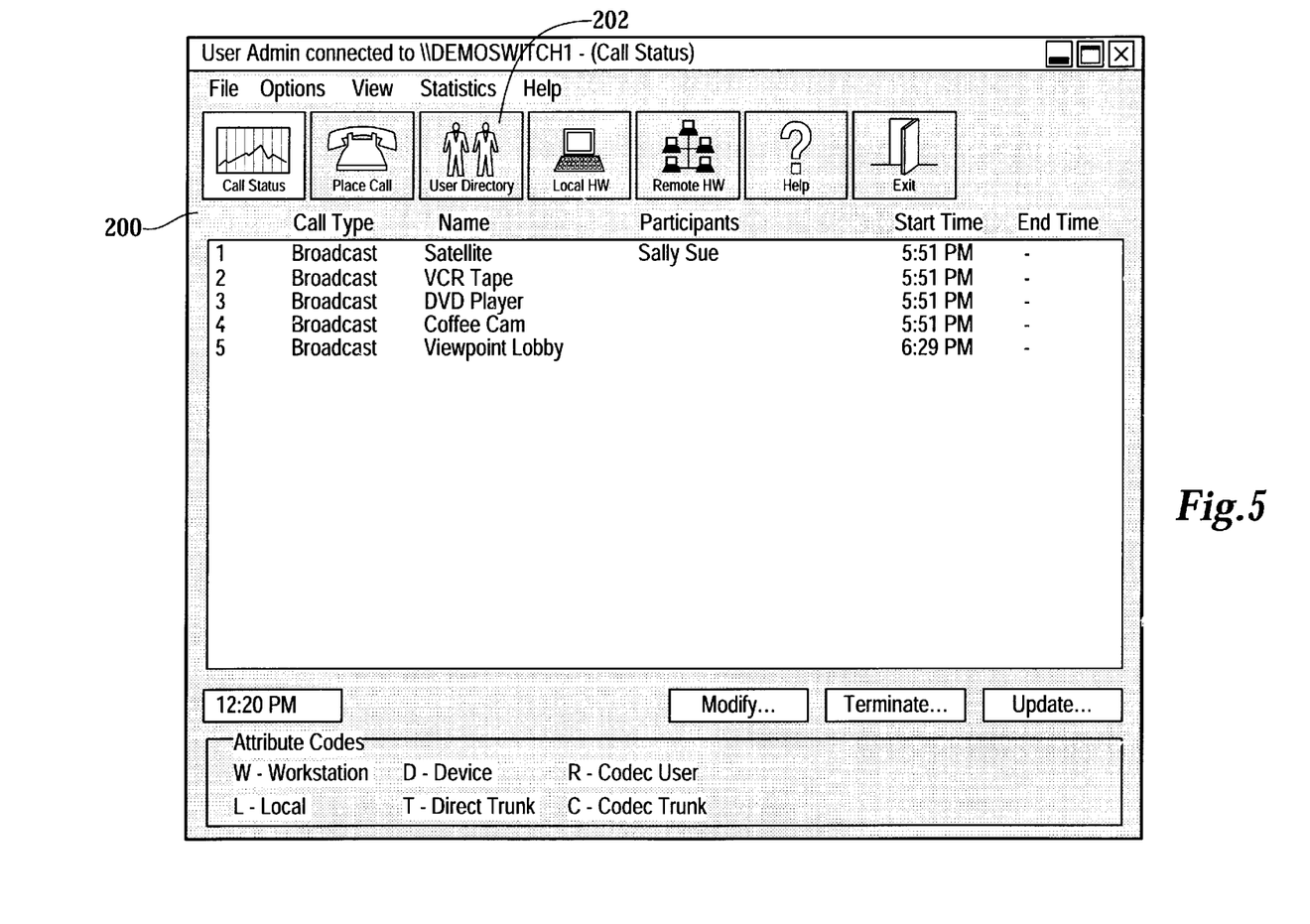
FIG. 5 depicts a VBX Administrator Window in accordance with the present invention.
Figure 6:
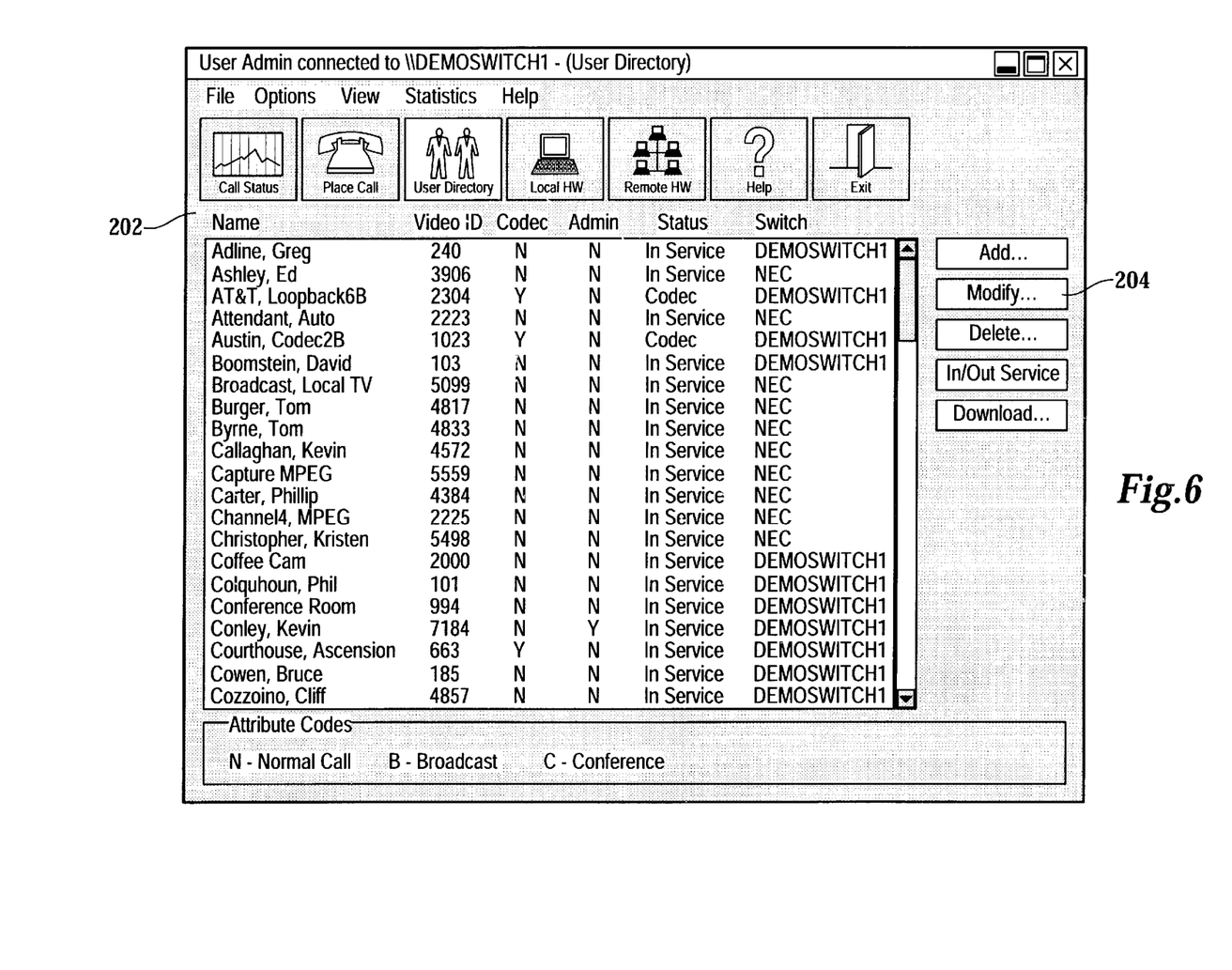
FIG. 6 depicts a User Directory Window in accordance with the present invention.
Figure 7:
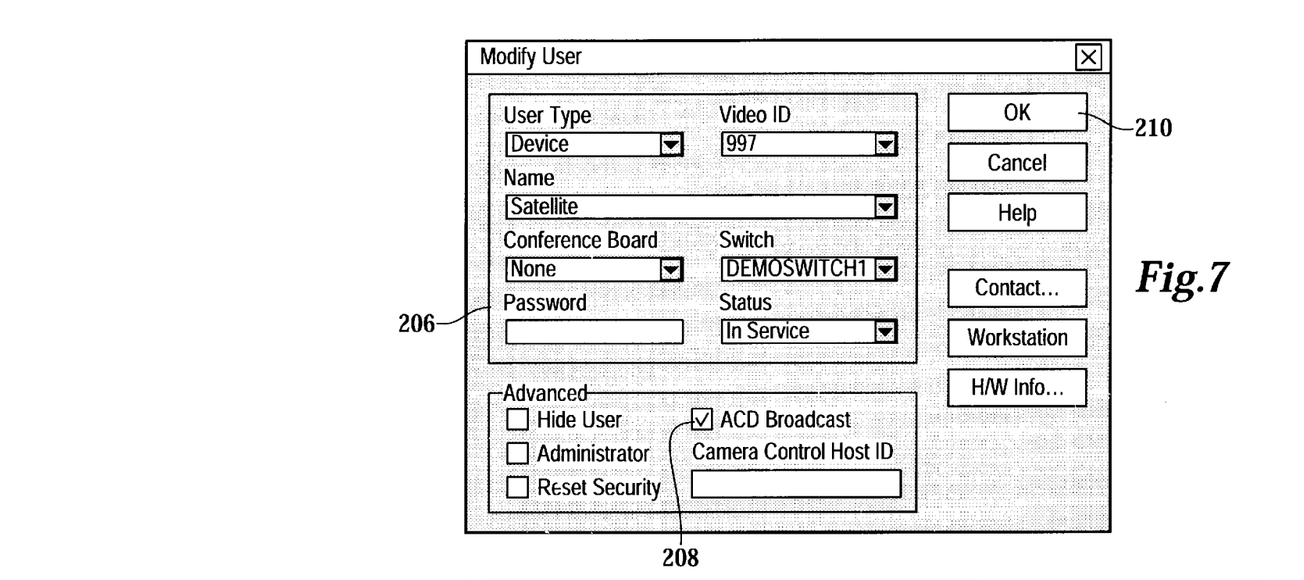
FIG. 7 depicts a Modify User Window in accordance with the present invention.

Now referring to FIGS. 5–7 in combination with FIG. 1, the process for activating an ACD broadcast 32 will be described. The ACD Filter 30 and ACD broadcasts 32 are activated by using the an administration tool, which part of the VBX Server software. An ACD broadcast 32 is activated by launching the VBX Administrator application and connecting to the VBX Server 22. When the Administration Window 200 is displayed, the User Directory 202 should be selected. The User Directory 202 displays all connected users, which includes codecs (such as 46, 48, 50, 52 and 54), multimedia sources 32, end points 34, and monitors 36. Once, the user is selected by clicking on the appropriate entry in the list, the Modify button 204 should be clicked. The Modify User Window 206 will appear for the selected user. The user is designated as an ACD broadcast 32 by simply selecting the ACD broadcast check box 208 and then clicking the OB button 210. The ACD Filter 30 must be configured for each ACD broadcast 32 before the ACD Filter 30 can process any callers directed to the ACD broadcast 32.

Figure 1:
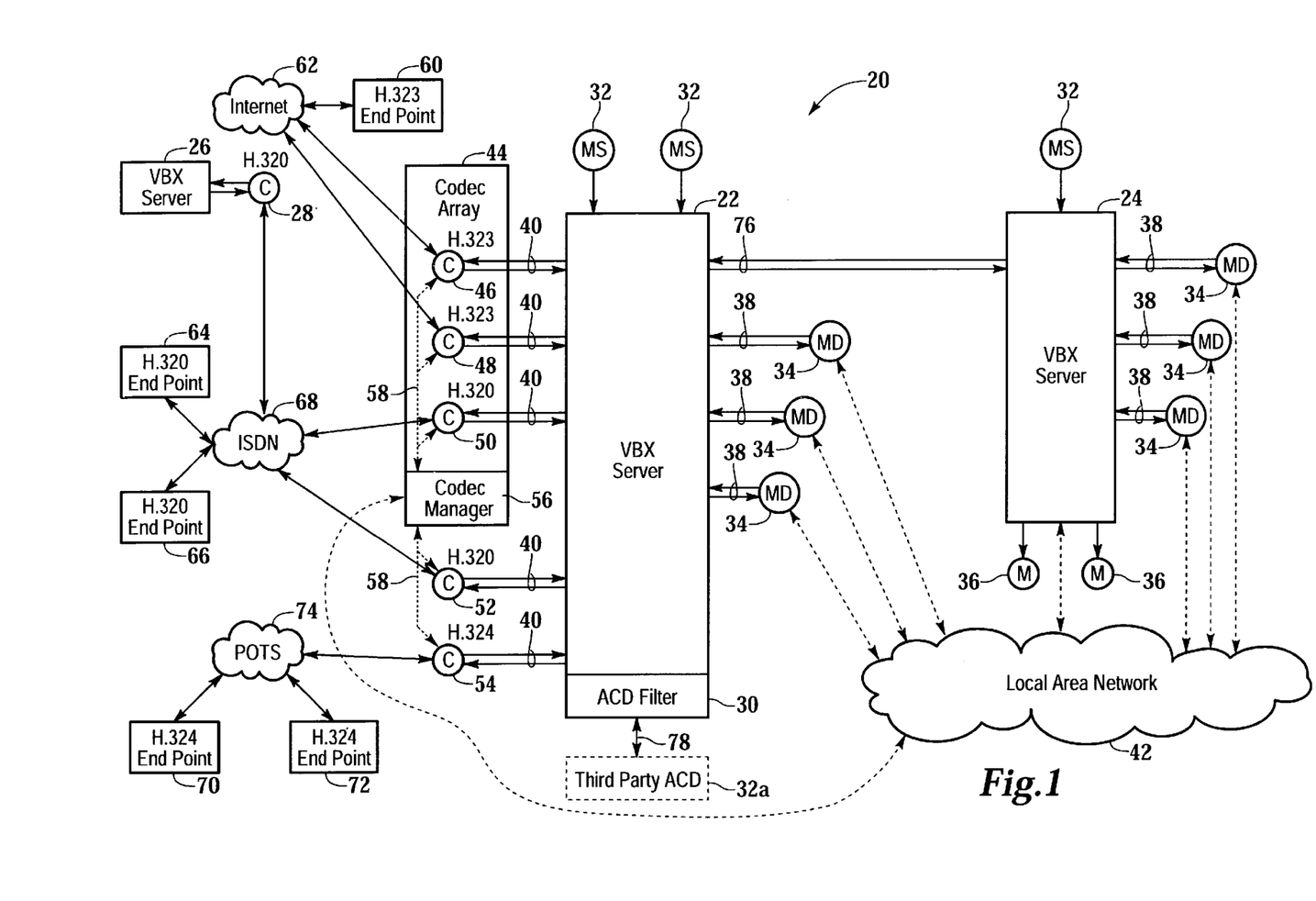
FIG. 1 is a block diagram of a multimedia communications network in accordance with the present invention.
Figure 8:
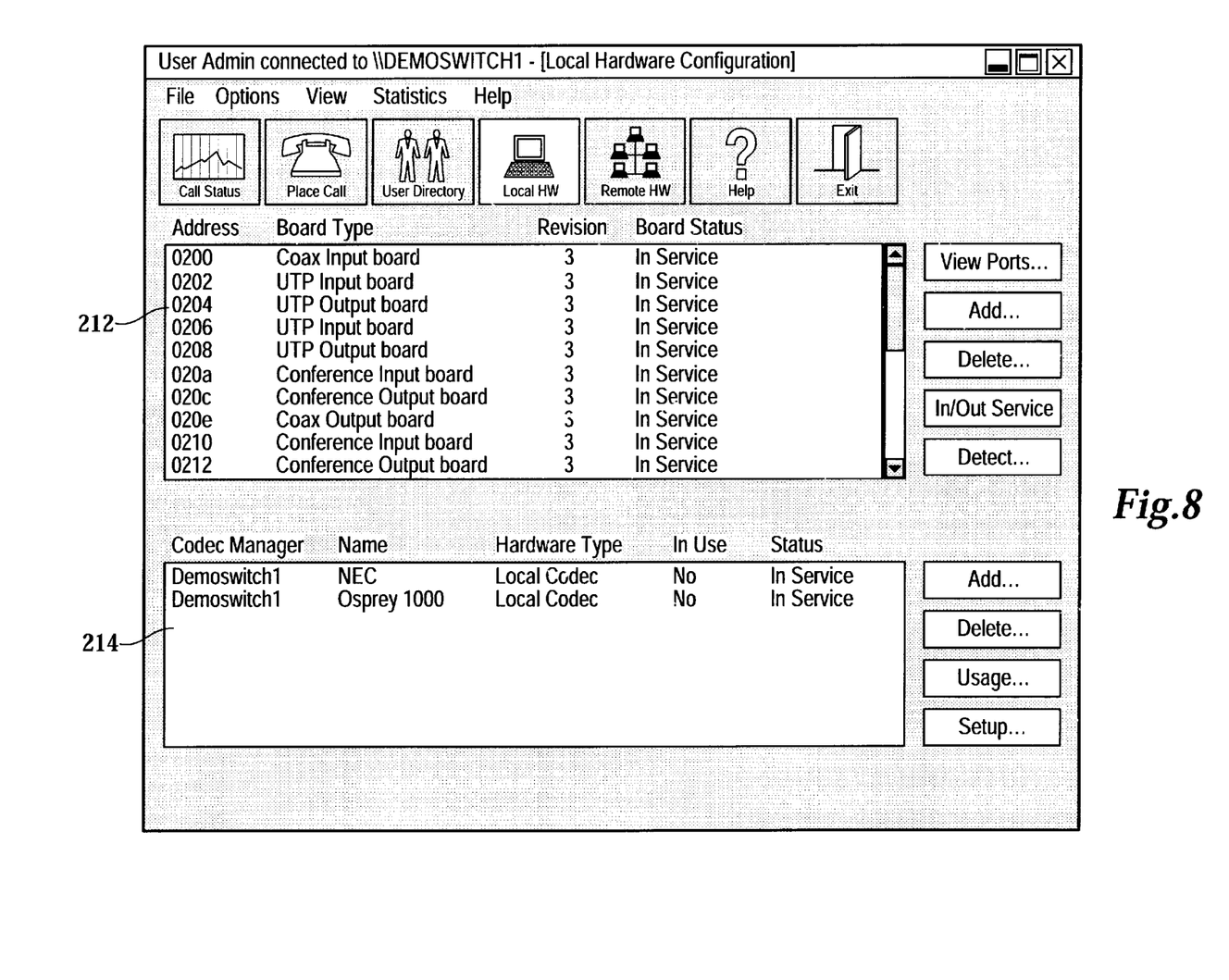
FIG. 8 depicts a Local Hardware Window in accordance with the present invention.
Figure 9:
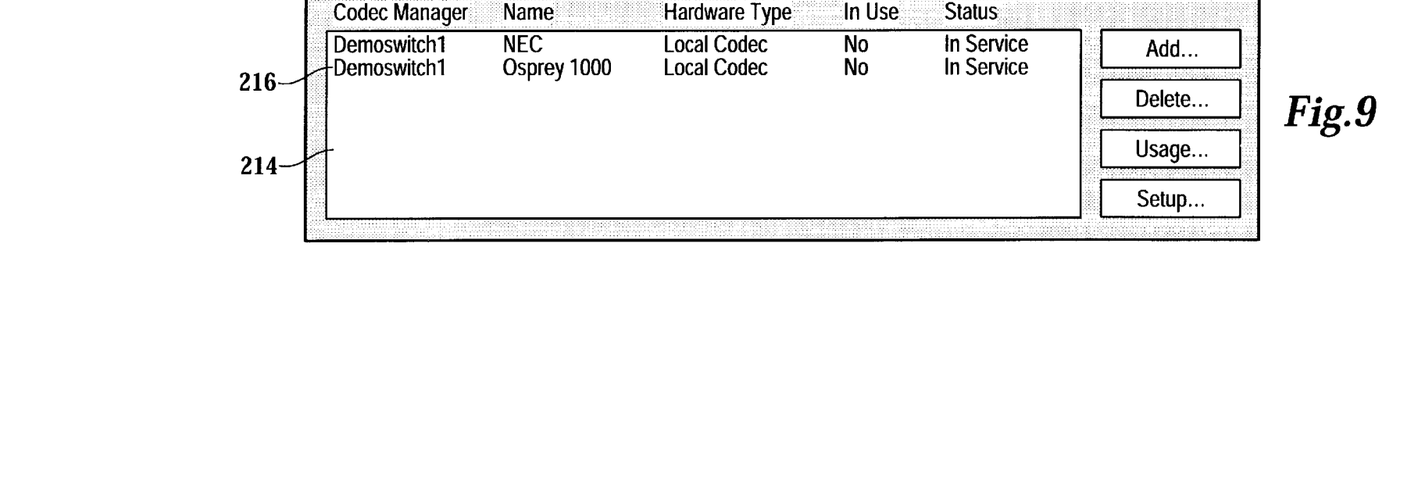
FIG. 9 depicts an External Hardware Panel in accordance with the present invention.
Figure 10:
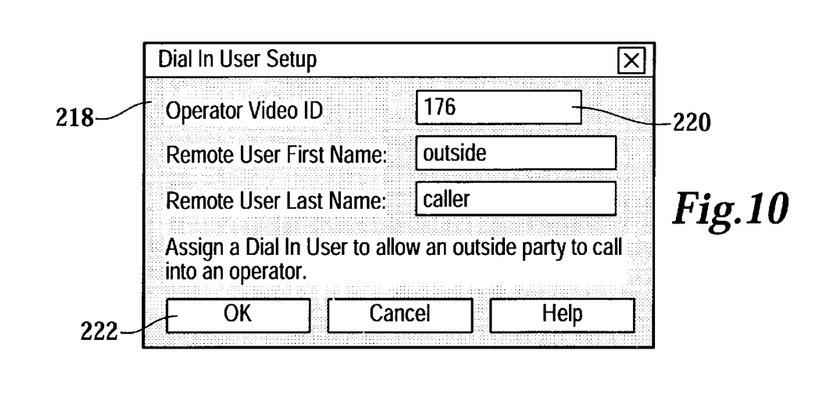
FIG. 10 depicts a Dial In User Setup Window in accordance with the present invention.

Referring now to FIGS. 8–10 in combination with FIG. 1, the VBX Server 22 will be configured to automatically route an incoming multimedia call received by a codec 46, 48, 50, 52 or 54 to the ACD broadcast 32. The Local Hardware Window 212 is selected from the VBX Administrator application. The codec is selected from the External Hardware Panel 214 by double-clicking on the codec entry 216. Once the Dial In User Setup Window 218 is displayed, the video ID of the ACD broadcast 32 is entered in field 220. Any calls received by the codec will be automatically routed to the ACD broadcast 32 once the OK button 222 is clicked.

Figure 11:
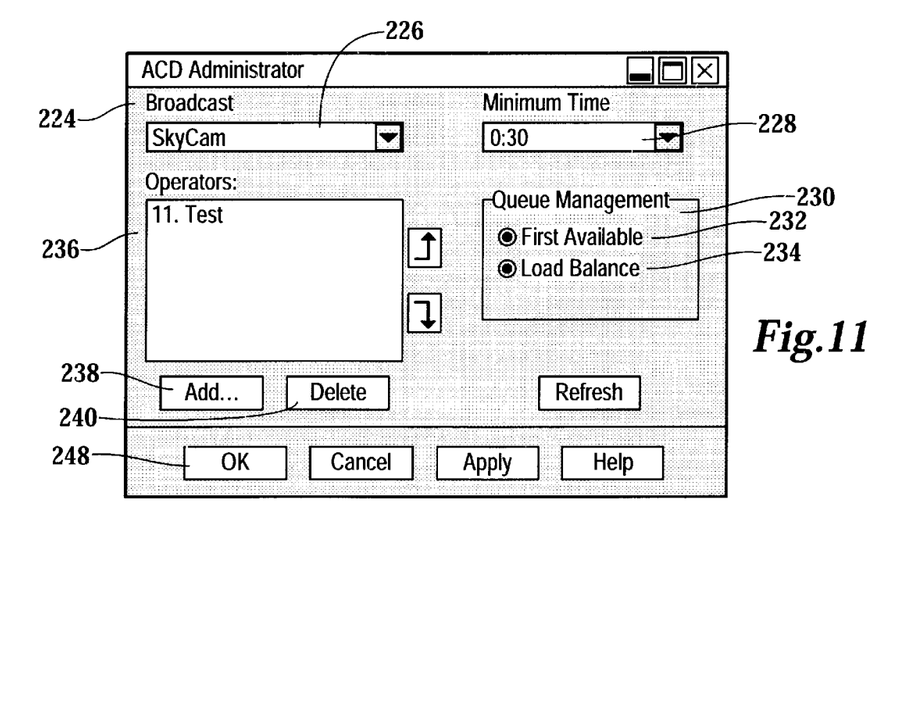
FIG. 11 depicts an ACD Administrator Window in accordance with the present invention.
Figure 12:
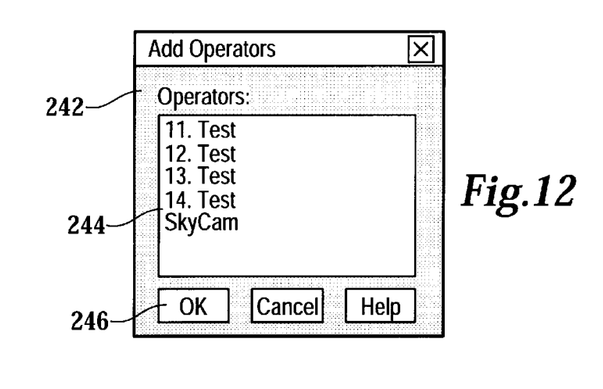
FIG. 12 depicts an Add Operators Window in accordance with the present invention.

Now referring to FIGS. 11–12 in combination with FIG. 1, one or more end points 34 (operators) will be assigned to the ACD broadcast 32. An ACD utility application is used to assign operators for each ACD broadcast 32, to configure the minimum queue time, and to select the method for transferring calls. When the ACD utility application is run, an ACD Administrator Window 224 is displayed. The ACD broadcast 32 is selected from the Broadcasts Drop-Down list 226. The minimum time that a caller must remain connected to the ACD broadcast 32 is display and can be modified in field 228. The available queue management methods are displayed and can be selected in the Queue Management Panel 230. In this embodiment, two queue management methods are available: first available 232, or load balanced 234.

If the first available method 232 is selected, a call connected to the ACD broadcast 32 will be transferred to the first destination end point 34 or operator who is available. The ACD Filter 34 goes down the list of operators 236 in order of priority to find the first available operator. An operator is available when their end point 34 is on-line, their "Do Not Disturb" option is off, and they are not currently on a multimedia call or audio call. If none of the operators 236 are available, no action will be taken.

If the load balance method 234 is selected, the calls connected to the ACD broadcast 32 are routed evenly across all listed operators 236 who are available. No action is taken when no operators are available. As before, an operator is available when their end point 34 is on-line, their "Do Not Disturb" option is off, and they are not currently on a multimedia call or audio call. If none of the operators 236 are available, no action will be taken.

Operators can be added to the list of operators 236 using the Add button 238. Likewise, operators can be deleted from the list of operators 236 by selected the operator to be deleted and clicking on the Delete button 240. If the Add button 238 is clicked, an Add Operators Window 242 will be displayed. Simply click on the operators listed in panel 244 to be assigned to the ACD broadcast 32. Then click the OK button 246 to save the operators. Likewise, click the OK button 248 to save the ACD Filter settings.

Figure 13:
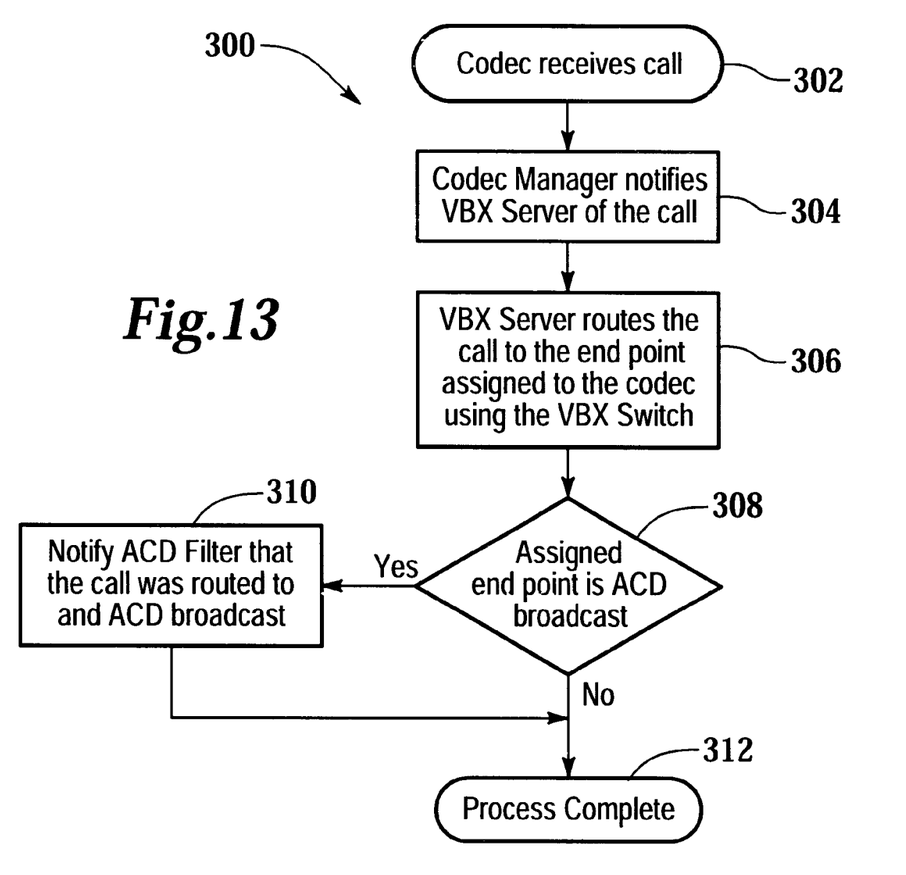
FIG. 13 is a flowchart illustrating an Initial Call Routing Process in accordance with the present invention.

Referring now to FIG. 13 in combination with FIG. 1, the VBX Initial Call Routing Process 300 will be described. The VBX Initial Call Routing Process 300 begins when a call is received by a codec 46, 48, 50, 52 or 54 in block 302. Thereafter, the Codec Manager 56 notifies the VBX Server 22 of the call in block 304. The VBX Server 22 then uses the VBX switch to route the call to the end point assigned to the codec 46, 48, 50, 52 or 54 in block 306. The assigned end point can be any of the end points 34, multimedia sources 32 or monitors 36 shown in FIG. 1. The process of assigning an end point to a codec was previously described in reference to FIGS. 8–10. If the assigned end point is an ACD broadcast 32, as determined in decision block 308, the ACD Filter 30 is notified that the call was routed to the ACD broadcast 32 in block 310. Once the ACD Filter 30 is notified or if the assigned end point was not an ACD broadcast, as determined in decision block 308, the call routing process in completed in block 312.

Figure 14:
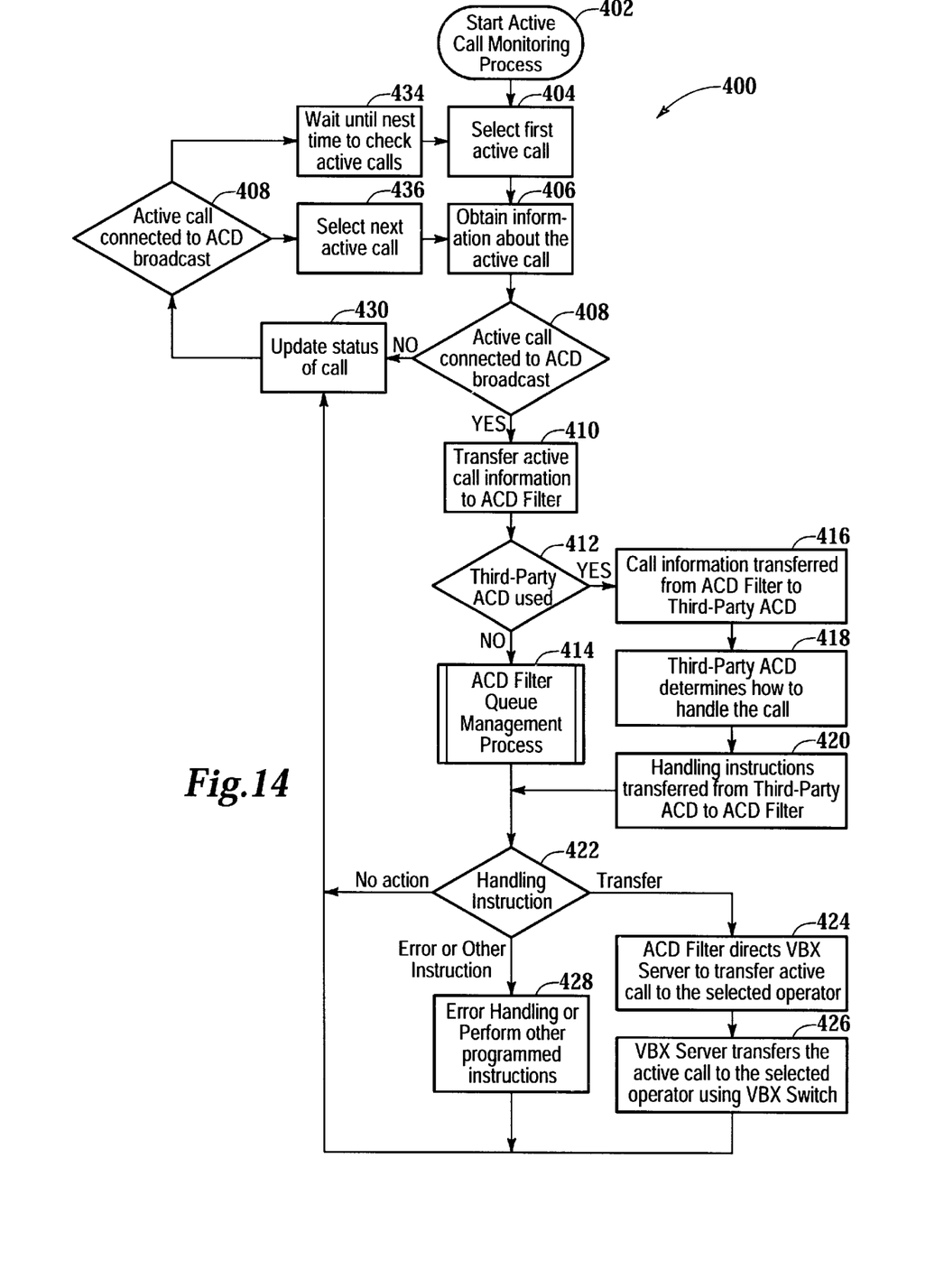
FIG. 14 is a flowchart illustrating a VBX Active Call Monitoring Process in accordance with the present invention.

Referring now to FIG. 14 in combination with FIG. 1, the VBX Active Call Monitoring Process 400 will be described. Once the Active Call Monitoring Process 400 starts in block 402, the first active call is selected in block 404 and information about the active call is obtained in block 406. If the active call is connected to an ACD broadcast 32, as determined in decision block 408, the active call information is passed to the ACD Filter 34 through an API in block 410. If a Third-party ACD is not being used, as determined in decision block 412, the ACD Filter Queue Management Process is run in block 414. The ACD Filter Queue Management Process will be described below in reference to FIG. 15. If, however, a Third-party ACD 32 is being used, as determined in decision block 412, the active call information is transferred from the ACD Filter 30 to the Third-party ACD 32 in block 416. The Third-party ACD 32 then determines how to handle the active call in block 418 and transfers the handling instructions to the ACD Filter 30 in block 420.

If the handling instruction from the ACD Filter in block 414 or the Third-party ACD in block 420 is transfer, as determined in decision block 422, the ACD Filter 30 directs the VBX Server 22 to transfer the active call to the selected operator in block 424. Next, the VBX Server 22 transfers the active call to the selected operator using the VBX switch in block 426. If, however, the handling instruction is not no action or transfer, as determined in decision block 422, an error handling routine or customized handling process will be run in block 428.

If, however, the handling instruction from the ACD Filter in block 414 or the Third-party ACD in block 420 is no action, as determined in decision block 422, or the active call has been transferred to the selected operator in block 426, or the error handling routine or customized handling process is complete in block 428, or the active call is not connected to an ACD broadcast 32, as determined in decision block 408, the status of the active call is updated in block 430. If all active calls have been checked, as determined in decision block 432, the process waits until the next time to check the active calls in block 434 and the process repeats by selecting the first active call in block 404. Generally, the VBX Server 22 monitors all active calls every 20 seconds. If, however, all active calls have not been checked, as determined in decision block 432, the next active call is selected in block 436 and the process repeats by obtaining information about the active call in block 406.

Figure 15:
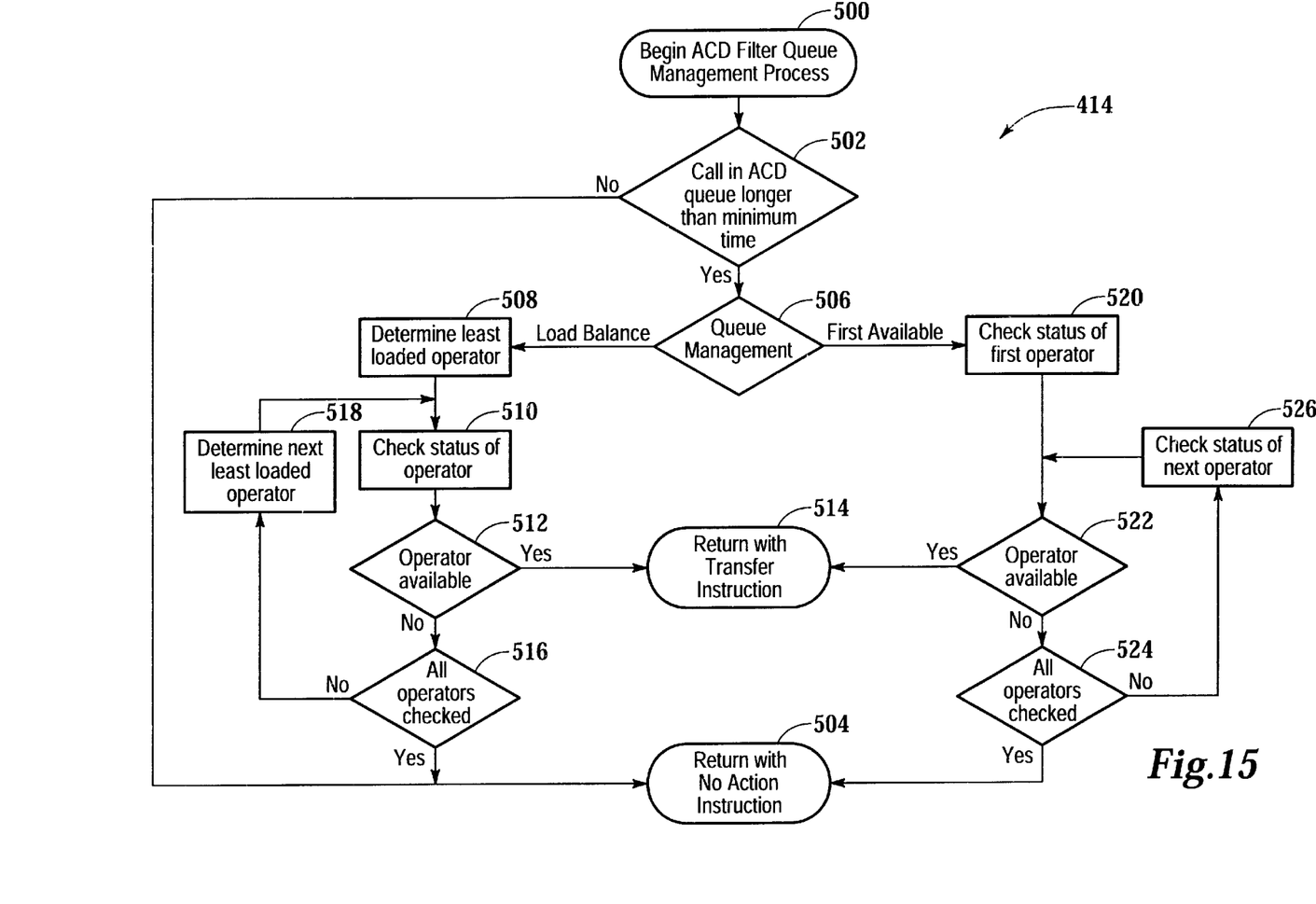
FIG. 15 is a flowchart illustrating an ACD Filter Queue Management Process in accordance with the present invention.

Now referring to FIG. 15 in combination with FIG. 1, the ACD Filter Queue Management Process 414 will be described and begins in block 500. If the active call has not been connected to the ACD broadcast 32 for longer than a minimum time period, as determined in decision block 502, a no action instruction is returned in block 504. If, however, the active call has been connected to the ACD broadcast 32 for longer than a minimum period of time, the selected queue management method determines the next course of action in decision block 406.

If the load balance method was selected, the least loaded operator is determined in block 508 and the status of the operator is checked in block 510. If the operator is available, as determined in decision block 512, a transfer instruction is returned in block 514. An operator is available when their end point is on-line, is not operating in a "do not disturb" mode, and is not busy with a current multimedia call or an audio call. If, however, the operator is not available and all the operators on the list have not been checked, as determined in decision block 516, the next least loaded operator is determined in block 518 and the status of that operator is checked in block 510. This process repeats until an available operator is found, as determined in decision block 512, or all operators in the list have been checked, as determined in decision block 516. If all operators on the list have been checked, a no action instruction is returned in block 504.

If the first available method was selected, as determined in decision block 506, the status of the first operator is checked in block 520. If the operator is available, as determined in decision block 522, a transfer instruction is returned in block 514. If, however, the operator is not available and all the operators on the list have not been checked, as determined in decision block 524, the status of the next operator is checked in block 526. This process repeats until an available operator is found, as determined in decision block 522, or all operators in the list have been checked, as determined in decision block 524. If all operators on the list have been checked, a no action instruction is returned in block 504. The setting of the minimum time period, queue management method and list of operators were previously described in reference to FIGS. 11 and 12.

The operation and flexibility of present invention will now be illustrated by a few examples. The present invention could be used by a bank that has a lot of branch banks scattered around a metropolitan area to provide "video banking" services. A customer could visit a branch bank close to his or her residence and have a video-conference with a loan or financial officer, who is located at the bank's central office. Thus the more highly trained personnel at the bank's central office can remotely video conference with customers that need assistance that the branch bank cannot provide. This saves the customer time and money by being able to go to the branch bank instead of the central office. The bank also saves money by with reducing the staffing at the branch bank or allowing less trained employees to staff the branch bank.

The present invention may also be used in a customer support and/or help desk role. Customer support deals with outside customers; whereas a help desk deals with internal employees. The present invention may be used to perform basic call screening at first level of support and then provide a second level of support, such as sales, technical support or accounting. This is possible because the invention allows an operator to transfer a call to another operator or to an ACD broadcast, which serves as a queue. So, at the first level, the call would come into the VBX Server and get placed in the ACD broadcast until the call is transferred to an operator. The operator may merely welcome the caller and ask "How can I direct your call?" The caller could then be transferred to another ACD broadcast when he or she asks to speak with someone in sales. So the call would stay in the sales ACD broadcast a few seconds or until a salesperson is available. The ACD filter or Third-party ACD would then have the call transferred to a salesperson, so this is the second level of support. If the call was misdirected or the caller needs some technical support in addition to some sales support, the salesperson could then transfer the call back to the receptionist or to yet another ACD broadcast, maybe the tech support queue. This process could go on indefinitely. In addition, the present invention allows multimedia conferencing, so if there were actually first, second, and third level technicians, and the current technician could not answer the question, another technician could be conferenced in to solve the problem. Thus, the first level technician would get some little training along the way.

In a different example, the present invention could provide multiple-languages rather than support levels. In this scenario, the present invention supports a multilingual call center where callers from various countries can call into the call center. To provide multilingual support, the available codecs, ACD broadcasts and operators would be allocated by language using different phone numbers. So English callers will dial in on the English phone number, German callers on the German phone number, and French callers on the French phone number. The English caller would be initially routed to an English broadcast or queue. Similarly, a German caller would be initially routed to a German queue, and a French caller would be initially routed to a French queue. So the three queues may play the same multimedia message, just in different languages. Now, the call center may have multilingual operators such that a first operator speaks English and French, a second operator speaks English only, a third operator speaks German, and a fourth operator speaks German and French. The ACD filter would be programmed with this operator information, which phone numbers corresponded to which languages, and which queues correspond into which languages. Thus a French caller could be transferred from the French queue to either the first or fourth operator depending on method used to determine the next available operator. Similarly an English caller could be transferred from the English queue to either the first or second operator.

Although preferred embodiments of the invention have been described in detail, it will be understood by those skilled in the art that various modifications can be made therein without departing from the spirit and scope of the invention as set forth in the appended claims.

What is claimed is:

1. A system for automatically distributing a multimedia call received from a originating end point via a network, comprising:

a multimedia switch;

one or more codecs connected to the network and the multimedia switch, the one or more codecs controlled by a codec manager that notifies the multimedia switch when the multimedia call is received by the one or more codecs;

one or more multimedia sources connected to the multimedia switch;

one or more destination end points connected to the multimedia switch; and an automatic call distributor connected to the multimedia switch for determining whether to transfer the multimedia call from one of the multimedia sources to one of the destination end points.

2. A system for automatically distributing a multimedia call received from a originating end point via a network, comprising:

a multimedia switch;

one or more codecs connected to the network and the multimedia switch;

one or more multimedia sources connected to the multimedia switch;

one or more destination end points connected to the multimedia switch;

a local area network, wherein the multimedia switch, the one or more codecs and the one or more destination end points are connected to the local area network; and an automatic call distributor connected to the multimedia switch for determining whether to transfer the multimedia call from one of the multimedia sources to one of the destination end points.

3. The system as recited in claim 1, wherein the local area network is used to transmit control signals to the multimedia switch, the one or more codecs and the one or more destination end points.

4. The system as recited in claim 1, wherein the automatic call distributor is connected to the multimedia switch via the local area network.

* * * * *